United States Patent
Zechmeister et al.

(10) Patent No.: US 12,005,873 B2
(45) Date of Patent: Jun. 11, 2024

(54) DEVICE AND METHOD FOR OPERATING AN AUTOMATED PARKING BRAKE WITH AN ACTUATOR FOR A MOTOR VEHICLE

(71) Applicant: Robert Bosch GmbH, Stuttgart (DE)

(72) Inventors: Steffen Zechmeister, Bad Wimpfen (DE); Christian Jelenowski, Kupferzell (DE); Bernd Stoehr, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 311 days.

(21) Appl. No.: 17/634,263

(22) PCT Filed: Jun. 12, 2020

(86) PCT No.: PCT/EP2020/066302
§ 371 (c)(1),
(2) Date: Feb. 10, 2022

(87) PCT Pub. No.: WO2021/032338
PCT Pub. Date: Feb. 25, 2021

(65) Prior Publication Data
US 2022/0314952 A1  Oct. 6, 2022

(30) Foreign Application Priority Data
Aug. 16, 2019  (DE) .................... 10 2019 212 294.9

(51) Int. Cl.
*G07C 5/08* (2006.01)
*B60T 7/12* (2006.01)
*B60T 17/22* (2006.01)

(52) U.S. Cl.
CPC ............... *B60T 17/22* (2013.01); *B60T 7/12* (2013.01); *B60T 2201/10* (2013.01); *B60T 2270/406* (2013.01)

(58) Field of Classification Search
CPC ........ B60T 17/22; B60T 7/12; B60T 2201/10; B60T 2270/406
See application file for complete search history.

(56) References Cited

U.S. PATENT DOCUMENTS

2015/0251639 A1  9/2015  Sautter et al.
2016/0114779 A1  4/2016  Binder et al.
(Continued)

FOREIGN PATENT DOCUMENTS

DE         100 64 339 A1    6/2001
DE    10 2014 204 287 A1    9/2015
(Continued)

OTHER PUBLICATIONS

International Search Report corresponding to International Patent Application No. PCT/EP2020/066302, dated Sep. 16, 2020 (German and English language document) (5 pages).

*Primary Examiner* — Muhammad S Islam
(74) *Attorney, Agent, or Firm* — Maginot, Moore & Beck LLP

(57) ABSTRACT

The present disclosure relates to a device for operating an automated parking brake with an actuator for a motor vehicle, wherein the device comprises at least: a central control unit and an application-specific integrated circuit, which application-specific integrated circuit represents an interface between the control unit and the actuator. According to the disclosure, the device is characterized in that the application-specific integrated circuit has a functionally not changeable part and a part that can be functionally changed by means of program code, wherein the functionally changeable part is designed to carry out a specified error check. The disclosure further relates to a method for operating such a device.

14 Claims, 6 Drawing Sheets

(56) References Cited

U.S. PATENT DOCUMENTS

2018/0290642 A1   10/2018   Tschiene
2018/0345947 A1   12/2018   Rebholz-Goldmann et al.
2019/0270440 A1*  9/2019    Baehrle-Miller ..... B60T 13/662

FOREIGN PATENT DOCUMENTS

EP    3 385 934 A1    10/2018
JP    H10-21106 A     1/1998

* cited by examiner

DEVICE AND METHOD FOR OPERATING AN AUTOMATED PARKING BRAKE WITH AN ACTUATOR FOR A MOTOR VEHICLE

This application is a 35 U.S.C. § 371 National Stage Application of PCT/EP2020/066302, filed on Jun. 12, 2020, which claims the benefit of priority to Serial No. DE 10 2019 212 294.9, filed on Aug. 16, 2019 in Germany, the disclosures of which are incorporated herein by reference in their entirety.

The present disclosure relates to a device for operating an automated parking brake having an actuator for a motor vehicle, which device comprises at least: a central control unit and an application-specific integrated circuit, wherein the application-specific integrated circuit constitutes an interface between the control unit and the actuator. The device is characterized according to the disclosure in that the application-specific integrated circuit has a functionally unmodifiable portion, and a portion that is functionally modifiable by means of program code, wherein the functionally modifiable portion is designed to perform a specified error-check. The disclosure also relates to a method for operating a corresponding device.

BACKGROUND

An automatic parking brake (APB) is employed in vehicles to replace the mechanical parking brake for parking a vehicle securely. The APB usually consists of one electric motor per wheel on the rear axle of a vehicle, a pushbutton in the vehicle interior, and a device, i.e. the control module (ECU), for operating the APB. The motor is used here for closing and opening the parking brake, with the driver normally initiating this process by means of the pushbutton. In this process, given what is known as an integrated APB, the control module of the ESP system evaluates the pushbutton position and then actuates the motors of the APB.

For safety reasons, unintentional actuation of the APB motors during driving must be prevented, because this can lead to serious accidents. Patent application DE 10 2014 204 287 A1, for example, is known from the prior art and describes a suitable solution for this.

In addition, it is necessary to monitor the entire hardware of the APB control system continuously in order to detect immediately deviations from the expected state and, if applicable, initiate suitable measures to prevent jeopardizing the safety of the vehicle. The hardware is usually monitored by means of the central control unit present in the ECU and known as the microcontroller, in which special monitoring software imports and assesses measured values (e.g. current through the APB motors) or carries out special tests, for instance to establish whether there is a short circuit or a break in the motor cabling. If the APB control system is implemented in the ECU by an application-specific integrated circuit (APB-ASIC), this ASIC must also be monitored continuously in order to detect malfunctions in good time.

The microcontroller controls and monitors all the tests and the results obtained, and signals a hazard to the driver in the event of an error. This type of monitoring has two crucial disadvantages. First, it is generally slow, because the microcontroller can access the APB-ASIC only via a slow interface (e.g. SPI) in order to carry out tests; also the communication is often tied to a communication scheme of the ECU software, i.e. communication between microcontroller and APB-ASIC takes place only at certain times. Second, this constraint on communication results in complex software in the ECU even though the tests themselves are usually simple sequences of switching and measurement processes.

SUMMARY

In contrast, the method according to the disclosure and the device according to the disclosure advantageously allow faster performance of the test and hence higher availability of the system, for instance by clearance being given earlier in the event of a positive test result.

According to the disclosure, this is made possible by the features defined in the disclosure. The disclosure also contains further embodiments.

The disclosure relates to a device for operating an automated parking brake having an actuator for a motor vehicle, which device comprises at least: a central control unit and an application-specific integrated circuit, wherein the application-specific integrated circuit constitutes an interface between the control unit and the actuator. The device is characterized according to the disclosure in that the application-specific integrated circuit has a functionally unmodifiable portion, and a portion that is functionally modifiable by means of program code, wherein the functionally modifiable portion is designed to perform a specified error-check.

This is understood to mean that both a complete central control unit (for instance a microcontroller) and an additional application-specific integrated circuit are present in the APB control device. An application-specific integrated circuit (ASIC; also known as a custom chip) is essentially the opposite of a general-purpose integrated circuit: an ASIC is an electronic circuit that has been realized as an integrated circuit. Further modifications to the function of an ASIC are normally not possible.

The microcontroller normally performs the error-check of the hardware of the parking brake. In principle, an alternative would be to transfer the error-check simply from the microcontroller to the APB-ASIC. When an APB-ASIC is employed, the APB hardware could be monitored by means of the APB-ASIC if this forms the interface between the microcontroller and the actuation of the APB motors. The monitoring software, however, would have to switch the APB-ASIC continuously into the required mode to carry out tests.

To avoid this, the disclosure provides for the use of a "programmable ASIC". This means that the ASIC, which in principle cannot be modified functionally because of its structure, is given a portion that is functionally modifiable by means of program code. In a sense, a microcontroller is integrated in the ASIC. While the executable functions, for instance, still cannot be functionally modified on the ASIC, it is possible by means of the variably downloaded program code to adapt the selection of the currently desired functions (micro-instructions), and the execution, sequence and repetitions thereof, flexibly to the given requirements.

According to the disclosure, this functionally modifiable portion is designed to perform a specified error-check. The functionally modifiable portion shall therefore also be referred to as an active test controller (ATC). In other words, the ASIC is designed to perform various error-checks. The error-check can relate to the hardware of the parking brake or to the application-specific integrated circuit or to the entire control device. The particular error-check is specified by means of the downloaded program code, taking into account, and in combination with, the unmodifiable functions associated with the ASIC. The application-specific integrated circuit can thereby carry out an error-check completely autonomously, and in a manner adapted to different situations and/or requirements.

For example, the disclosure makes it possible that the APB-ASIC, for instance, can carry out and evaluate autonomously the necessary tests for monitoring the hardware. The APB-ASIC merely signals to the microcontroller whether the tests were completed as expected or whether an error has occurred. This autonomy leads to faster performance of the tests, i.e. to the faster discovery of errors and to a considerable reduction in complexity of the necessary test software in the microcontroller. In the event that an error does not exist and the tests were concluded without an error message, the higher-level hardware can likewise be cleared for use earlier by the microcontroller. This is important in particular when the vehicle has been started and, for safety reasons, the parking brake is not allowed to be released until the system has been confirmed to be free of errors.

In an advantageous embodiment, the device is characterized in that the portion that is functionally modifiable by means of program code comprises a programmable controller, in particular comprises a programmable finite state machine or comprises a processor core.

This shall be understood to mean that the ASIC comprises, as already described, two regions, of which one is defined as functionally modifiable. Integrated in this region is, for example, a programmable finite state machine (pFSM). Advantageously, the pFSM has access to the functionally unmodifiable portion of the ASIC.

In order to be able to execute tests autonomously, for instance in the APB-ASIC, a programmable controller (programmable finite state machine, pFSM) is employed. Unlike a hard-wired FSM, the programmable FSM can be programmed by micro-instructions, and therefore can be employed flexibly and adapted as required to new requirements. This type of FSM can be employed to execute microcode and hence to control the processing unit. Those instructions that the pFSM can execute are set at the start of development of the pFSM and are adapted to the requirements in each case. For example, if voltage and currents are meant to be measured and compared with reference values, suitable instructions must be provided for this.

As an alternative to the programmable finite state machine envisaged, it would also be possible to implement a complete CPU core in the ASIC in order to execute a measuring or monitoring program.

In a possible embodiment, the device is characterized in that the portion that is functionally modifiable by means of program code comprises a program memory for storing instructions for controlling function blocks.

This shall be understood to mean that the ASIC comprises, as already described, two regions, of which one is defined as functionally modifiable. Integrated in this region is, for example, a program memory. Advantageously, communication between the program memory and the central control unit is facilitated by means of the general interface of the ASIC. The instructions placed in the program memory are used to control the function blocks, for instance by means of the pFSM.

In a preferred embodiment, the device is characterized in that the portion that is functionally modifiable by means of program code comprises a data storage device for storing measured values obtained and/or for storing expected measured values.

This shall be understood to mean that a data storage device is integrated in the portion of the ASIC defined as functionally modifiable. In this data storage device can be stored, for example, the measured values obtained or defined reference values. The data storage device is also called a measured-value storage device. In other words, both results from a measurement and expected values can be placed in the measured-valued storage device. For instance, a threshold value for a voltage to be measured can be stored here. If this voltage is exceeded in a measurement, the test is identified as containing errors, and signaled to the microcontroller. If, on the other hand, the measured value remains below the stored threshold value, the system is deemed to be free of errors.

In an alternative development, the device is characterized in that the portion that is functionally modifiable by means of program code comprises an error-finding module for ascertaining errors in the program code, which error-finding module is designed to allow stepped execution of the program.

This shall be understood to mean that an error-finding module (also referred to as a debug module or debugger for short) is integrated in the portion of the ASIC defined as functionally modifiable. The error-finding relates here in particular to the program code; in particular, the debug mode is provided in order to simplify writing the program during development. In this module, the program in the pFSM is executed step-by-step under the control of the microcontroller, thereby allowing error-finding to be carried out should the program behave other than expected.

In an advantageous embodiment, the device is characterized in that the application-specific integrated circuit is designed to allow access by the programmable controller to internal functions of the application-specific integrated circuit.

This shall be understood to mean that an interconnection exists between the functionally modifiable portion and the functionally unmodifiable portion of the ASIC. For example, the program code stored in the functionally modifiable portion defines the type and sequence of the instructions. These instructions are addressed and actuated by the pFSM. The implementation of the instructions, for instance measuring the desired signal values, is achieved by means of functions which are permanently fixed in the unmodifiable portion of the ASIC. It is thereby possible, for example, to optimize both the flexibility and the speed of the system.

The disclosure also relates to a method for operating a device for operating an automated parking brake having an actuator for a motor vehicle, which device comprises at least: a central control unit and an application-specific integrated circuit, wherein the application-specific integrated circuit constitutes an interface between the control unit and the actuator. The method is characterized according to the disclosure in that the application-specific integrated circuit has a functionally unmodifiable portion, and a portion that is functionally modifiable by means of program code, wherein the functionally modifiable portion performs a specified error-check.

This is understood to mean that a specific action, for instance a defined monitoring test, is performed by means of the custom-programmed ASIC. The same device, however, can also be used to perform a differently specified action, for instance a differently defined monitoring test, by a different program code being loaded into the ASIC. In this regard, reference is made largely to the statements already given relating to the described device according to the disclosure. A specified error-check shall therefore be understood to mean advantageously that this is specified by the program code, or by the program code in combination with the in the functionally unmodifiable stored main functions of the application-specific integrated circuit.

In an advantageous embodiment, the method is characterized in that the portion that is functionally modifiable by means of program code comprises a programmable controller, in particular comprises a programmable finite state machine or comprises a processor core, wherein the programmable controller performs an error-check on the basis of the program code.

This is understood to mean that, for example, the pFSM implements the error-check as defined in the program code. In particular, it is intended that the pFSM executes the instructions written in the program code. For this purpose, the instructions are routed from the program memory to the pFSM. The pFSM then addresses the relevant functions in order to implement the instructions. The functions are set in particular in the functionally unmodifiable portion of the ASIC.

In a possible embodiment, the method is characterized in that the programmable controller accesses internal functions of the application-specific integrated circuit.

This is understood to mean that an interconnection exists between the functionally modifiable portion and the functionally unmodifiable portion. The programmable controller uses this interconnection to access the set functions. The instructions to be performed are accordingly performed by means of these functions.

In a preferred embodiment, the method is characterized in that an autonomous error-check of the automated parking brake is performed by means of the functionally modifiable portion.

This is understood to mean that the defined tests are performed autonomously by the ASIC. To do this, the ASIC does not need to be activated and observed by the central control unit. Instead, monitoring tests are carried out autonomously by the ASIC. Likewise, the ASIC autonomously assesses the monitoring tests. Performing the autonomous error-check is made possible, for example, by the execution of program codes from the program memory by the pFSM.

In an alternative development, the method is characterized in that an autonomous error-check of the application-specific integrated circuit is performed by means of the functionally modifiable portion.

In an advantageous embodiment, the method is characterized in that in the event that an error is identified, feedback from the application-specific integrated circuit is given to the central control unit.

For example, this method can be implemented in software or hardware or in a mix of software and hardware in a control module, for instance. Also advantageous is a computer program product or computer program containing program code, which can be stored on a machine-readable storage device or storage medium such as a semiconductor memory, a hard drive memory or an optical memory, and is used to perform, implement and/or actuate the steps of the method according to one of the embodiments described above, in particular when the program product or program is executed on a computer or a device.

BRIEF DESCRIPTION OF THE DRAWINGS

It should be pointed out that the features listed individually in the description can be combined with one another in any technically sensible way to disclose further embodiments of the disclosure. Further advantages and practical aspects of the disclosure appear in the description of exemplary embodiments with reference to the accompanying figures, in which.

DETAILED DESCRIPTION

Figure 1:
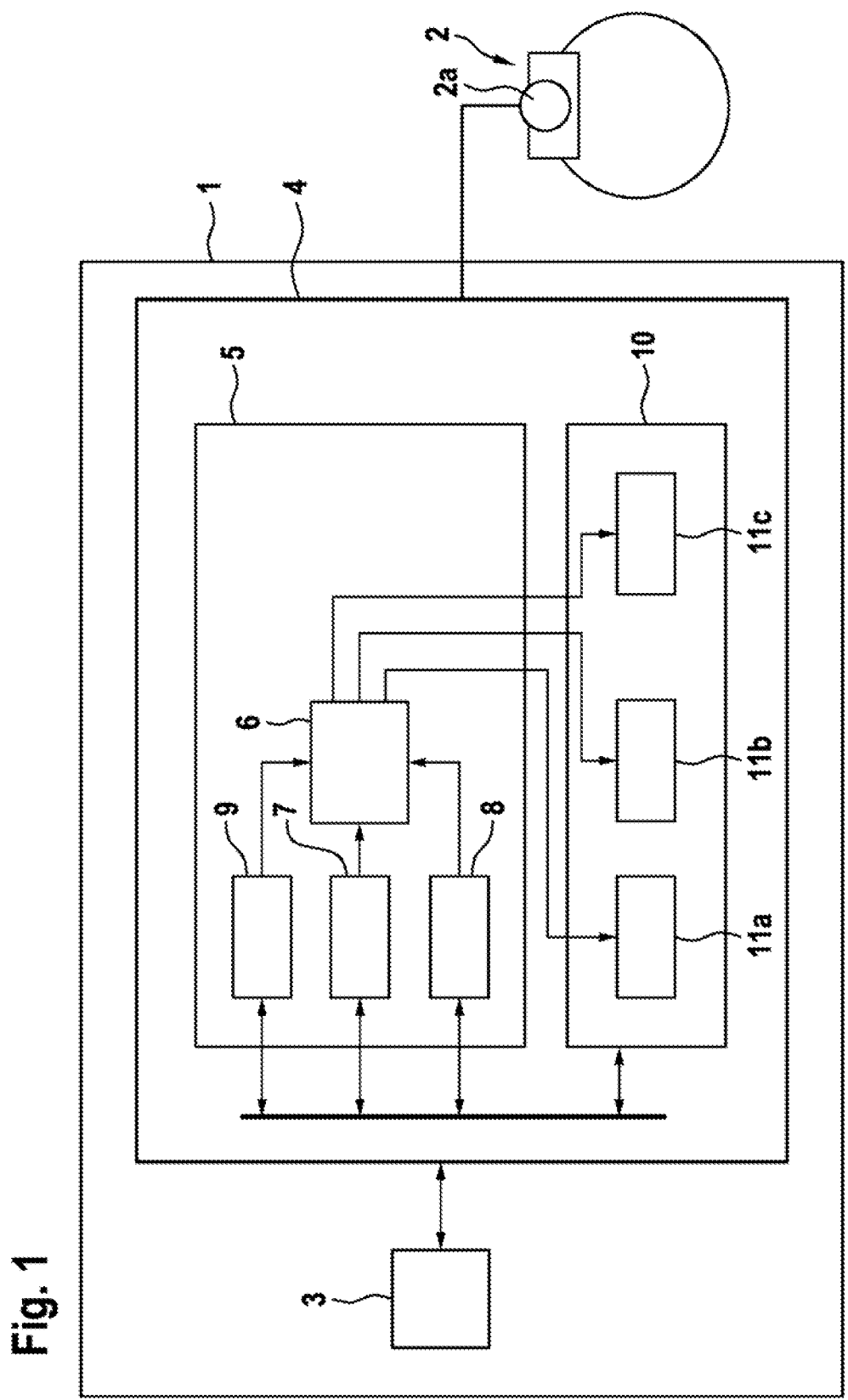
FIG. 1 is a schematic diagram of the device.

FIG. 1 shows a schematic diagram of the device 1 for operating an automatic parking brake 2 according to an embodiment of the disclosure. The device comprises the central control unit 3, which is embodied as a microcontroller by way of example. In addition, the device comprises an application-specific integrated circuit 4 (ASIC, or even application-specific circuit). The circuit 4 comprises a functionally unmodifiable portion 10 (also referred to as an application-specific region). Herein are set the main functions, for example current measurement 11a, voltage measurement 11a, miscellaneous measurement 11c. The circuit 4 also comprises a functionally modifiable portion 5. Based on its function, the functionally modifiable portion 5 is also referred to as an active test controller, because it is here that the error-check takes place in accordance with the program code loaded at the time. The functionally modifiable portion 5 comprises a programmable controller 6. For example, this controller is in the form of a finite state machine (FSM). The finite state machine can be referred to appropriately as a pFSM (programmable finite state machine) because of the capability to be programmed variably. The functionally modifiable portion 5 also comprises a program memory 7, details of which will be given in the later figures. In addition, the functionally modifiable portion 5 comprises a data storage device 7 for storing measured values obtained or expected measured values (hence also called a measured-value storage device). An error-finding module 9 (also called a debugger) is also provided.

FIG. 1 shows an exemplary embodiment of the layout of a programmable finite state machine 6 (pFSM), integrated in an application-specific integrated circuit 4 (ASIC). The pFSM 6 is designed such that it can execute a set of instructions that have been permanently defined in advance (e.g. MEASURE_MOT_VOLTAGE, for measuring a voltage at the APB motors 2a). The instructions are stored for this purpose in a volatile or nonvolatile memory 8 in the ASIC 4, and read out and executed by the pFSM 6. In the case of a volatile memory, for instance RAM cells, the program must be downloaded to the ASIC 4 by the central control unit 3 whenever the ECU is restarted. It remains here until the power supply to the ECU is disconnected. When employing a nonvolatile memory, for instance flash cells or EEPROM cells, the program has to be programmed only once into the cells and can remain there until the product reaches its end of life. The program memory 7 can be programmed via the standard interface of the ASIC 4 that is used for communication between ASIC 4 and central control unit 3.

Figure 2:
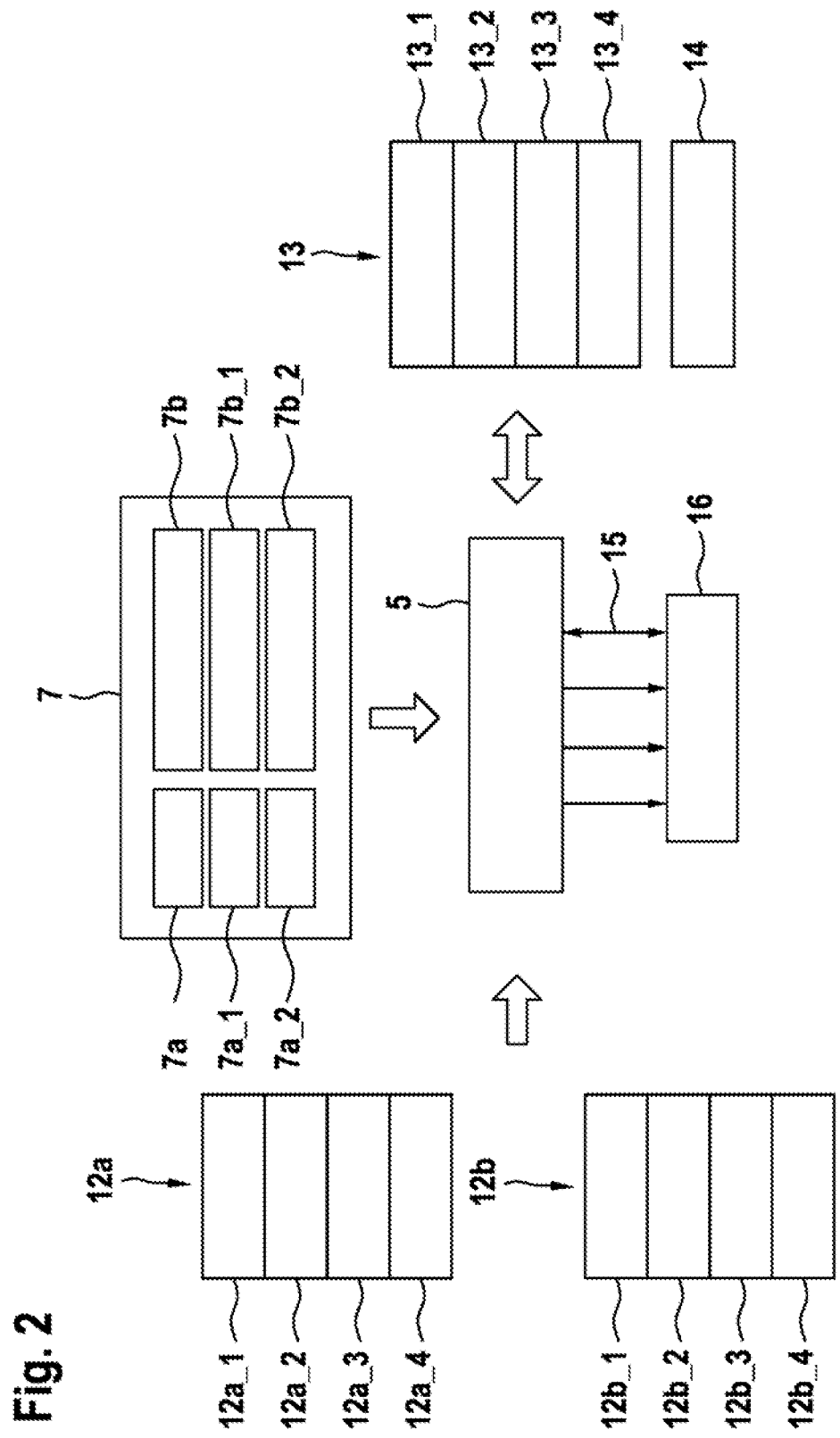
FIG. 2 shows a structure of the functionally modifiable portion of the device.

FIG. 2 shows a structure of the functionally modifiable portion of the device, i.e. the architecture of the active test controller 5. This receives from the program memory 7 the micro-instructions to be executed. Each instruction consists of a command 7a and a list of instruction signals 7b (signal). Two commands 7a_1 and 7a_2 and the two signals 7b_1 and 7b_2 are shown here by way of example. Each instruction should have a fixed length to allow a simple and inexpensive implementation. In the illustration, a length of eight is chosen: three bits for the command 7a, and five bits for the instruction signal 7b. In principle, a different choice of length is conceivable. In addition, the active test controller 5 receives information from what is called a constant register bank 12, where FIG. 2 shows a first constant register bank 12a (containing the constant registers 12a_1 to 12a_4 by way of example) and a second constant register bank 12b (containing the constant registers 12b_1 to 12b_4 by way of example). The active test controller 5 is also in communication with the user register bank 13 (containing the user registers 13_1 to 13_4 by way of example) and the test register bank 14. In addition, the active test controller 5 sends (and receives) signals 15 using signal receivers/signal transmitters 16.

Figure 3:
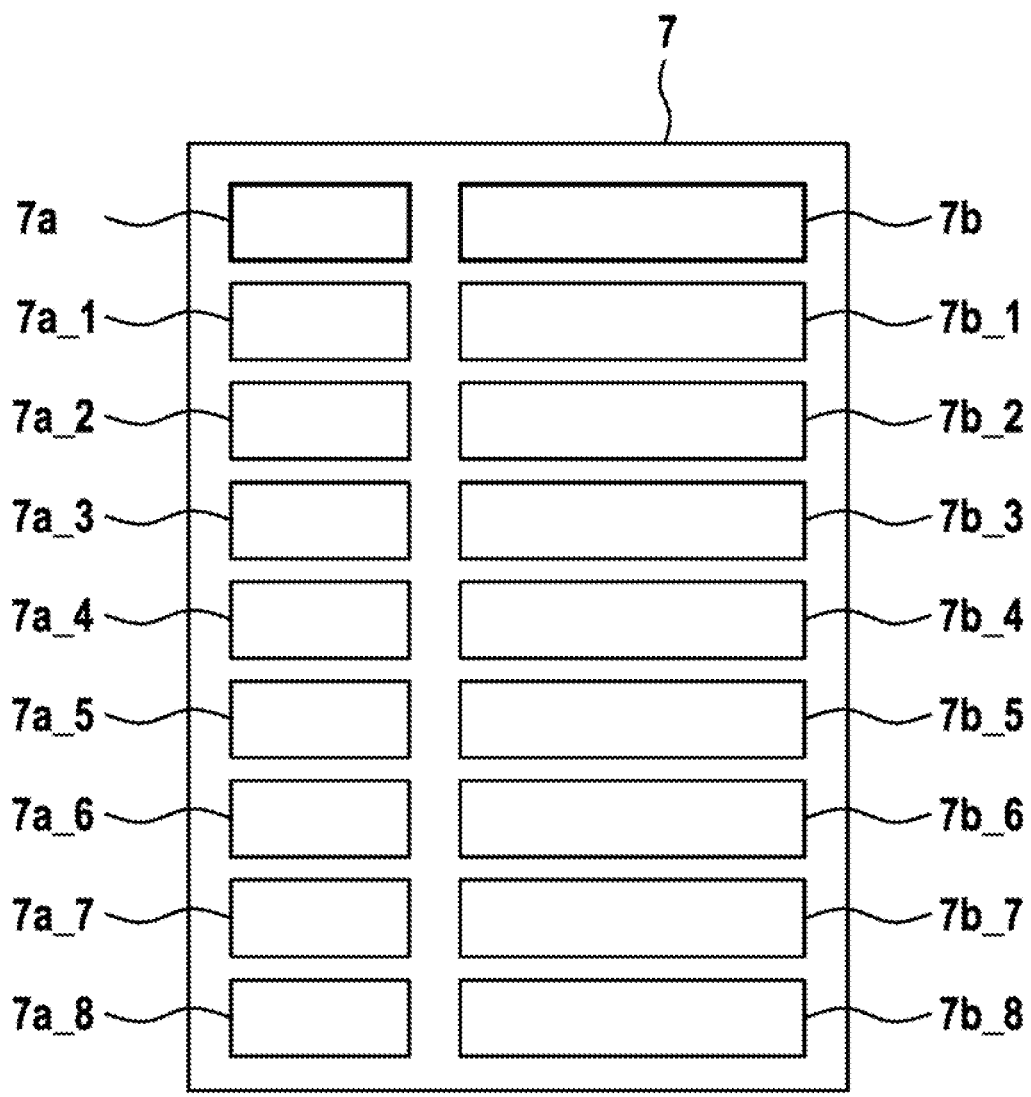
FIG. 3 is a schematic diagram of the micro-instructions in the program memory.

FIG. 3 shows a schematic diagram of micro-instructions in the program memory. As mentioned with reference to FIG. 2, a length of three bits, for example, can be provided for the commands 7a. Given a length of three bits for the commands 7a, eight different commands are possible that can be performed by the micro-instructions. The signals 7b in each command are used to control the function blocks in the ASIC 4. Said signals 7b can start measurements, have calculations performed, or switch further functions. Measurements carried out can then be compared, for instance using a Compare micro-instruction, with an expected value in order to ascertain thereby whether or not an error exists. FIG. 3 shows an example.

7a_1 corresponds to the "Drive" command with signal 7b_1 "ON_HS1_A".
7a_2 corresponds to the "Measure" command with signal 7b_2 "All 4 motor voltages".
7a_3 corresponds to the "Expect" command with signal 7b_3 "DSHS1_A".
7a_4 corresponds to the "Compare" command with signal 7b_4 "CReg< >SReg".
7a_5 corresponds to the "Wait" command with signal 7b_5 "1 ms, 2 ms".
7a_6 corresponds to the "Cal" command with signal 7b_6 "Form 1".
7a_7 corresponds to the "Stop" command with signal 7b_7 "Stop Program".
7a_8 corresponds to the "Select" command with signal 7b_8 "Select Register Bank".

Figure 4:
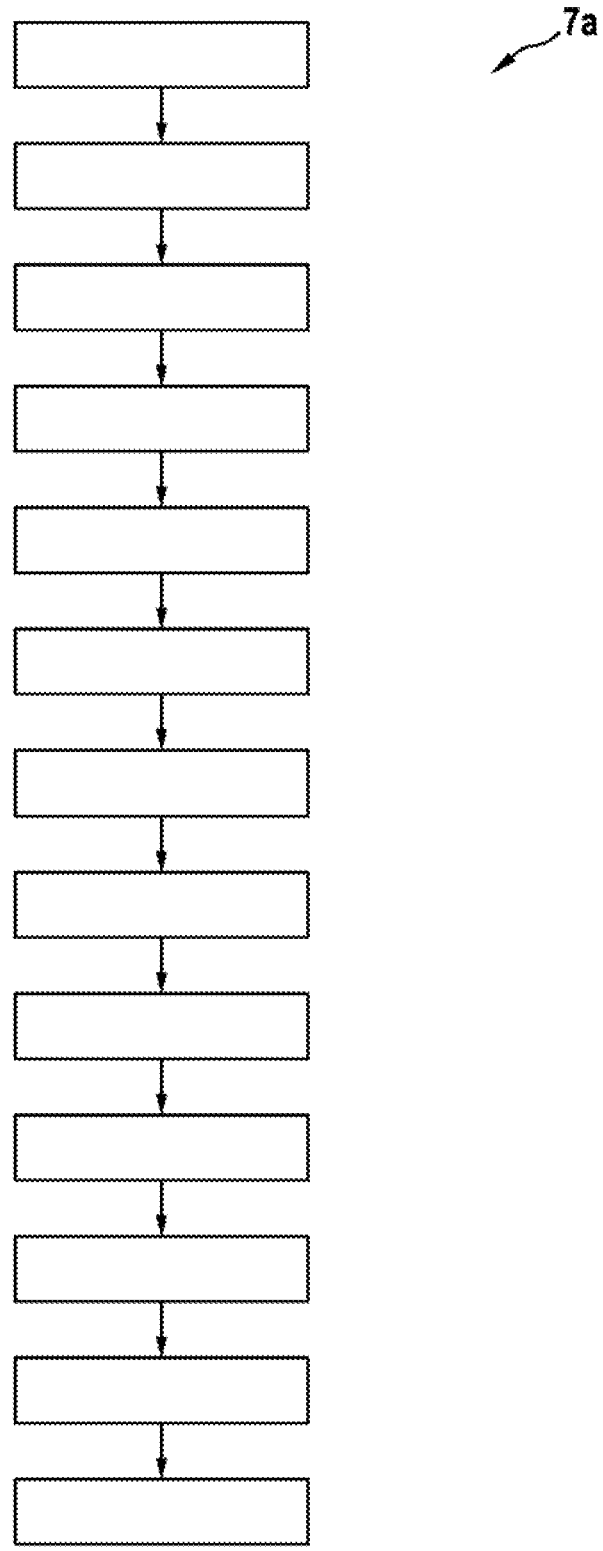
FIG. 4 shows an instruction sequence of micro-instructions.

FIG. 4 shows an example of an instruction sequence of micro-instructions 7a: WAIT_1, DRIVE on_V_REF_x, DRIVE ENA_HS1_A, DRIVE ENA_HS2_A, DRIVE ON_HSy_A, DRIVE OFF_HSy_A, EXPECT CLEAR, DRIVE OFF_LS1_A, DRIVE OFF_LS2_A, DRIVE OFF_LS1_A, DRIVEOFF_LS2_A, DRIVE DIS_HSy_A, STOP C_VOFF. The first instruction makes the pFSM 6 wait for one microsecond in order to ensure, for instance, that applied electrical signals are stable. DRIVE commands switch electrical signals in the ASIC 4. The EXPECT command checks whether an error bit is set at this instant in time, and ensures that this is notified to the microcontroller 3 after the program ends. The last command stops the pFSM 6 running the program and switches the test signals back off.

Figure 5:
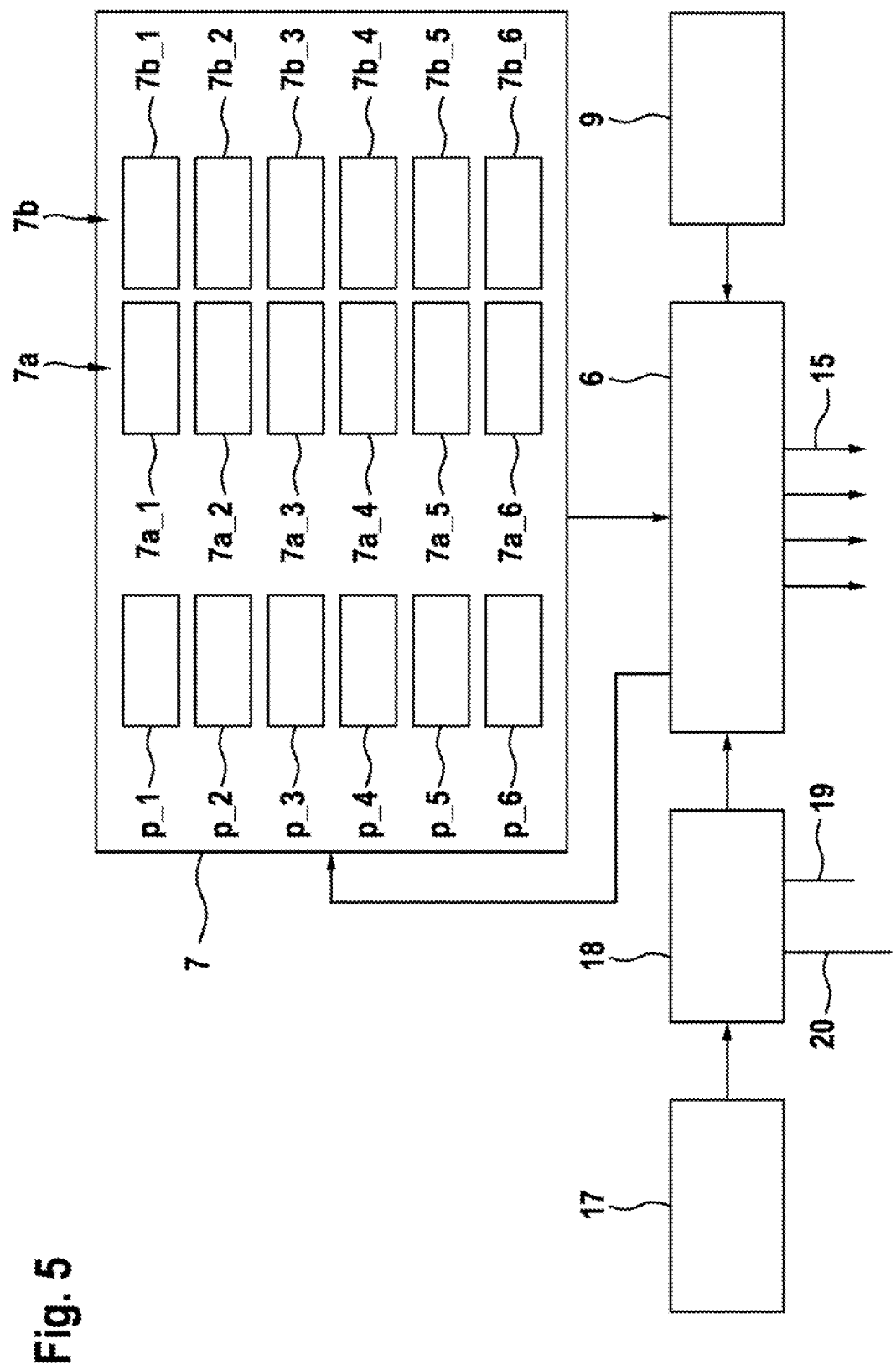
FIG. 5 shows interaction of the programmable controller and the program memory.

FIG. 5 shows an interaction between the programmable controller 6 and the program memory 7. The start address 17 of the next instruction sequence is placed in a register, and loaded 19 into the address generator 18 when the program is started. With every new micro-instruction, the address generator 18 increases by means of a counter 20 the address it outputs, thereby selecting the next instruction in the program memory 7. This instruction is read, decoded and performed by the programmable controller 6. P_1 here corresponds to the memory location 0x0 containing the command 7a_1 and the signal 7b_1. P_2 here corresponds to the memory location 0x1 containing the command 7a_2 and the signal 7b_2. The same applies analogously to p_3 to p_6 and to the commands 7a_3 to 7a_6 and the signals 7b_3 to 7b_6.

Figure 6:
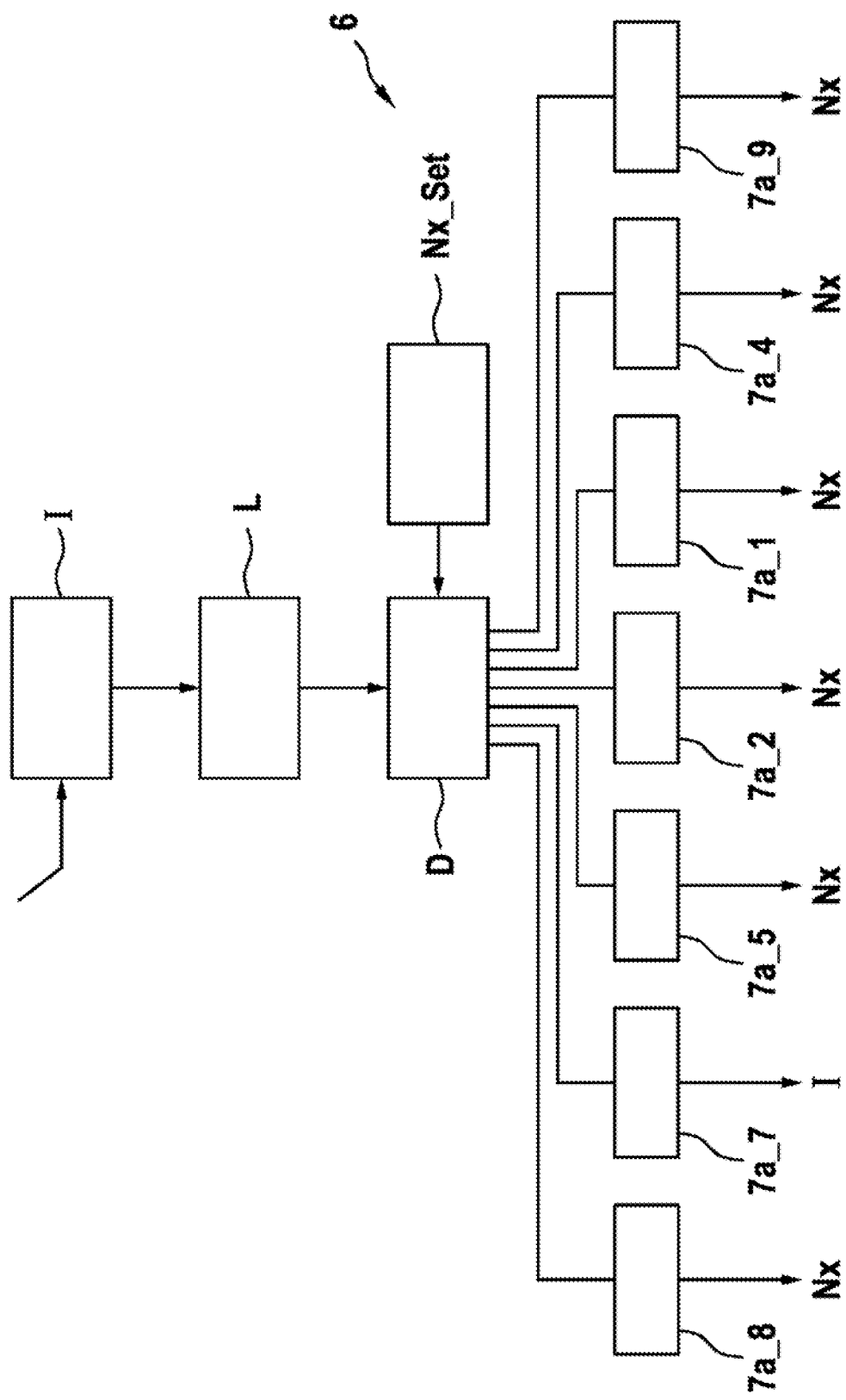
FIG. 6 is a diagram showing execution of the micro-instructions by the programmable controller.

FIG. 6 shows a diagram depicting execution of the micro-instructions by the programmable controller. FIG. 6 shows for this purpose a pFSM 6 by way of example. The following micro-instructions are depicted: I corresponds to "Idle", L corresponds to "Load", D corresponds to "Dispatch", Nx corresponds to "Next", Nx_Set corresponds to "Next Set cnt=1". 7a_1 to 7a_8 have already been described. A corresponding pFSM 6 is designed in accordance with the instructions required.

The invention claimed is:

1. A device for operating an automated parking brake having an actuator for a motor vehicle, the device comprising:
a central controller; and
an application-specific integrated circuit, the application-specific integrated circuit constituting an interface between the central controller and the actuator, the application-specific integrated circuit having a functionally unmodifiable portion and a portion that is functionally modifiable by program code, the functionally modifiable portion being configured to perform a specified error-check.

2. The device as claimed in claim 1, wherein the portion that is functionally modifiable by program code comprises a programmable controller.

3. The device as claimed in claim 1, wherein the portion that is functionally modifiable by program code comprises a program memory configured to store instructions that control function blocks.

4. The device as claimed in claim 1, wherein the portion that is functionally modifiable by program code comprises a data storage device configured to store at least one of (i) measured values obtained and (ii) expected measured values.

5. The device as claimed in claim 1, wherein the portion that is functionally modifiable by program code comprises an error-finding module configured to ascertain errors in the program code, the error-finding module being configured to allow stepped execution of the program code.

6. The device as claimed in claim 2, wherein the application-specific integrated circuit is configured to allow access by programmable controller to internal functions of the application-specific integrated circuit.

7. A method for operating a device for operating an automated parking brake having an actuator for a motor vehicle, the method comprising:
providing the device comprising (i) a central controller and (ii) an application-specific integrated circuit, the application-specific integrated circuit constituting an interface between the central controller and the actuator, the application-specific integrated circuit having a functionally unmodifiable portion and a portion that is functionally modifiable by program code; and
performing a specified error-check using the functionally modifiable portion of the application-specific integrated circuit.

8. The method as claimed in claim 7, wherein the portion that is functionally modifiable by program code comprises a programmable controller, the performing the specified error-check further comprising:

performing, with the programmable controller, an error-check based on the program code.

9. The method as claimed in claim 8, wherein the programmable controller is configured to access internal functions of the application-specific integrated circuit.

10. The method as claimed in claim 7, the performing the specified error-check further comprising:
   performing an autonomous error-check of the automated parking brake using the functionally modifiable portion.

11. The method as claimed in claim 7, the performing the specified error-check further comprising:
   performing an autonomous error-check of the application-specific integrated circuit using the functionally modifiable portion.

12. The method as claimed in claim 10, further comprising:
   giving, in response to an error being identified, feedback from the application-specific integrated circuit to the central controller.

13. The method as claimed in claim 8, wherein the programmable controller comprises one of (i) a programmable finite state machine and (ii) a processor core.

14. The device as claimed in claim 2, wherein the programmable controller comprises one of (i) a programmable finite state machine and (ii) a processor core.

* * * * *